Sept. 8, 1970 G. KANTOROWICZ 3,527,973

ELECTRON DELAY STRUCTURE COMPRISING A U-SHAPED ELECTRODE AND ELECTRON TUBE UTILIZING THE SAME

Filed Jan. 12, 1968

United States Patent Office 3,527,973
Patented Sept. 8, 1970

3,527,973

ELECTRON DELAY STRUCTURE COMPRISING A U-SHAPED ELECTRODE AND ELECTRON TUBE UTILIZING THE SAME

Gerard Kantorowicz, Paris, France, assignor to CSF-Compagnie Generale de Telegraphie Sans Fil, a corporation of France Filed Jan. 12, 1968, Ser. No. 697,333
Claims priority, application France, Jan. 13, 1967, 91,046
Int. Cl. H01j *25/42*
U.S. Cl. 315—3.5 5 Claims

ABSTRACT OF THE DISCLOSURE

An electronic delay structure comprises within an evacuated envelope, an elongated electrode, at one end of which two dispersive periodic delay line sections are positioned in front of each other. One of them is energized with a microwave signal and the other is coupled to an output. A U-shaped electrode surrounds the elongated electrode and a cathode is provided for emitting an electron beam into the drift space bounded by the two above mentioned electrodes. Crossed magnetic and electric fields are provided in the drift space. The magnetic field is different in the space between the two delay line sections and in the remainder of the drift space.

The present invention relates to delay lines such as described in the U.S. Pat. 3,341,733. This patent describes an electronic delay structure comprising a drift space in which an electric field and a magnetic field cross each other and wherein propagates a beam whose velocity can be controlled. Prior to entering and after leaving this space, the beam passes through input and output couplers, these couplers being constituted by delay line sections coupled to the beam, the latter being affected by the action of the intersecting fields. These lines are so selected that the signal fed to the input coupler propagates through the drift space through the medium of the fast cyclotron wave and can be extracted from this wave by the output coupler. The delay produced by transfer of the information across the drift space is controllable, preferably by controlling the transverse electric field in the waveguide.

It has also been shown in the copending patent application Ser. No. 627,472, filed by the applicant Mar. 31, 1967, for "Electronic Delay Line," now U.S. Pat. 3,417,-280, that the drift space and the couplers should be situated in different transverse magnetic fields.

With the linear structure described in the above mentioned patent and copending patent application, the magnet used is very large and complicated.

It is an object of this invention to simplify this structure.

It is another object of the invention to increase the limits wherein the delay obtained may be controlled.

In accordance with the invention, there is provided an electronic delay structure comprising an evacuated enclosure and within said enclosure a first elongated electrode; a first geometrically periodic delay line section, having dispersive phase velocity characteristics, extending along an end portion of said electrode; a U-shaped electrode, having two branches extending along said elongated electrode; a second geometrically periodic delay line section extending along the other side of the same end portion of said elongated electrode and having dispersive phase velocity characteristics; means for establishing crossed transverse electric and magnetic fields within said drift space; means for producing an electron beam and directing said beam into said drift space; collector means positioned for collecting said beam after emergence therefrom; means for energizing said first delay line section with a microwave signal; output means coupled to said second delay line section for abstracting the delayed signal therefrom; means for controlling said fields for adjusting the velocity of said beam substantially to the group velocity of the wave propagating in said delay line sections; said two delay line sections and said U-shaped electrode thus defining around said elongated electrode a U-shaped drift space having an input and an output.

For a better understanding of the invention and to show how the same may be carried into effect, reference will be made to the drawing accompanying the following description and in which.

Figure 1:
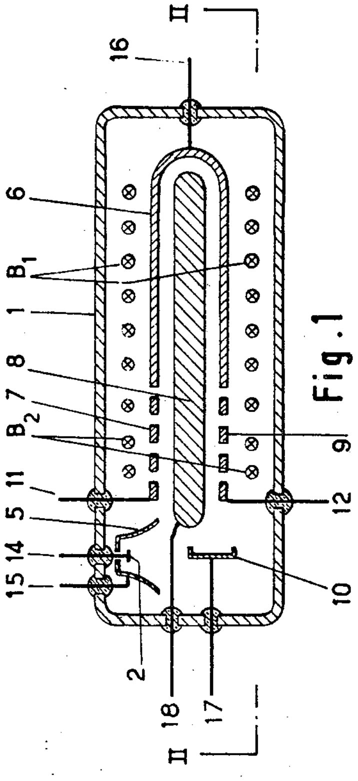
FIG. 1 is a section through a delay structure according to the invention.
Figure 2:
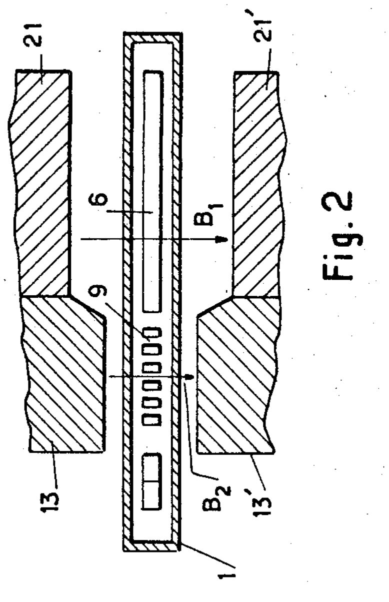
FIG. 2 is a section through FIG. 1 taken along the line II—II.

The delay structure illustrated in FIGS. 1 and 2 may be derived, for example, from the embodiment shown in FIG. 5 of the above mentioned patent, and in order to facilitate the understanding, the same reference numerals are used in the present FIG. 1 as were used in that patent.

The delay structure shown in FIG. 1 comprises an evacuated envelope 1, including a cathode 2, an electron optical system 5, a sole 6, an input coupler 7, a positive electdode 8, an output coupler 9, a collector 10. The delay structure has an input 11 and an output 12. Two magnets, whose pole pieces are shown as 13 and 13', are provided and the electrodes 5, 6, 10 and 8 have respective supply terminals 15, 16, 17, 18.

In accordance with the present invention, the electrode 6 is folded in U-fashion so that the couplers 7 and 9 are situated opposite one another. The electrode 8 has such a shape and is so positioned that the space between electrodes 7 and 8 between electrodes 6 and 8, and between electrodes 9 and 8, through which the electron beam issuing from the cathode 2 propagates, has a U-form. In this space, the electrons, which are subjected to the action of the magnetic field $B_1$ or $B_2$ illustrated in FIG. 1 by crosses which are circumscribed by circles, and of the electric field between the electrode 8 and the other electrodes opposite to it, follow a U-shaped path, since the electrons move pedpendicularly to the intersecting fields. It will be noted that the electric field changes direction on passing from one arm of the U to the other.

As described in the above mentioned copending patent application, field $B_1$ across the drift space is different from the field $B_2$ in the coupler sections. In the present embodiment the field $B_1$ is lower than the field $B_2$. Because of the U-form of the system, the same magnet may be used for both couplers 7 and 9.

This magnet (FIG. 2) comprises pole pieces 13–13' to provide the field $B_2$ and pole pieces 21–21' to provide the field $B_1$. The distance between pole pieces 21 and 21' is greater than that between the pole pieces 13 and 13' so that the field $B_1$ is weaker than the field $B_2$. Thus, the magnet is simpler than in the case of the above mentioned copending application. The operation of this electronic delay line is the same as in the above mentioned patent and copending patent application, the present invention being concerned only with a structural simplification, at least in the case when the electrode 8 is formed by an integral element.

Figure 3:
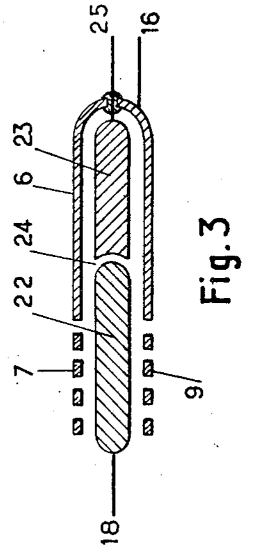
FIG. 3 is a schematic view, similar to that of FIG. 1, showing a modification.

FIG. 3, which shows only the electrode system, illustrates a modifiration in which the eleltrode 8 of FIG. 1 has been replaced by two distinct electrodes 22 and 23, separated from one another by a passage 24 forming a by-pass between the two arms of the U-shaped drift space. The electrode 22 is biased by the terminal 18, as was the electrode 8 in the case of FIG. 1, whilst the electrode 23 is biased from a separate terminal 25. The references 6, 7, 9 and 16 designate the same elements as in FIG. 1.

This arrangement enlarges the controllable delay range of the delay structure as follows:

Let it be assumed that the electrode 22 is at a certain predetermined potential fixed by the terminal 18, and that the electrode 23 is at such a potential that if its value were reduced any further, the electrons would not pass through the U-shaped space but would be reflected at the input to the drift space. This potential determines the maximum delay which can be produced by the line.

If, starting from this potential, the potential of the terminal 25 is increased, the electrons will follow the normal U-shaped path between the electrodes 6 and 23, the delay decreasing up to the time at which the electrons no longer pass right through the U-shaped space due to the fact that they are captured by the positive electrode. The corresponding potential on the terminal 25 thus determines the minimum delay which can be produced with the line, for a given fixed potential at the terminal 18.

In order to reduce the delay below this limit, without affecting the maximum delay, it is then merely necessary to place the terminal 25 at the potential of the electrode 6, and to reduce the potential on the terminal 18 until a value compatible with passage of the electrons through the drift space is reached. The electrons then pass from one branch of the U to the other, across the by-pass 24 which is relatively short, and with a delay which is relatively small in relation to the transit-time for the normal path round the drift space. This relatively small delay can then be progressively reduced by increasing the potential on the terminal 18, that is to say on the electrode 22, whilst the potential difference between the electrodes 6 and 23 stays at zero. This additional variation of the delay can be continued up to the time at which the potential of the electrode 22 becomes sufficiently high for it to capture the electrons, the delay at this point having reached a new minimum value. It is clear that the ratio between the maximum and minimum delays can thus be considerably increased, in comparison with the system of FIG. 1.

Figure 4:
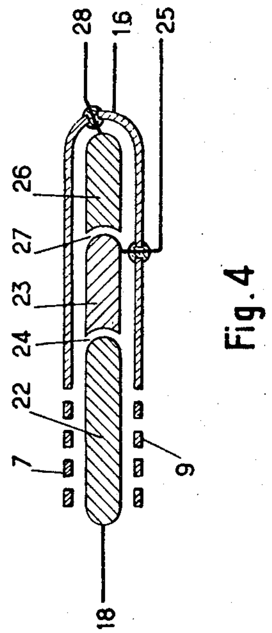
FIG. 4 is a view similar to that of FIG. 3, showing a further modification.

It is possible to provide several by-passes between the arms of the U-shaped drift space. FIG. 4 illustrates an example in which the electrode 8 of FIG. 1 has been replaced by three distinct electrodes 22, 23, 26, these being separated from one another by passages 24 and 27 which act as by-passes. The electrodes are supplied respectively from the terminals 18, 25, 28. By appropriate selection of the variation in the supply voltages, a delay variation can be achieved which covers an even wider range than hitherto described, and obeys any desired law.

Of course, the invention is not limited to the embodiments described which were given solely by way of examples.

What is claimed is:

1. An electronic delay structure comprising an evacuated enclosure and within said enclosure a first rectilinear elongated electrode; a first geometrically periodic delay line section, having dispersive phase velocity characteristics, extending along one end portion of said electrode; a U-shaped electrode, having two branches and a curved portion connecting said branches, said curved portion extending around the other end portion of said rectilinear elongated electrode, said branches respectively extending along the two opposite sides of said rectilinear elongated electrode; a second geometrically periodic delay line section extending along the other side of the same end portion of said elongated electrode as the said first delay line and having dispersive phase velocity characteristics, said two delay line sections and said U-shaped electrode thus defining around said elongated electrode a U-shaped drift space having an input and an output; means for establishing crossed transverse electric and magnetic fields within said drift space; means for producing an electron beam and directing said beam into said drift space; collector means positioned for collecting said beam after emergence therefrom; means for energizing said first delay line section with a microwave signal; output means coupled to said second delay line section for abstracting the delayed signal therefrom; means for adjusting the velocity of said beam substantially to the group velocity of the wave propagating in said delay line sections by varying said electric field.

2. A delay line as claimed in claim 1, wherein said magnetic field establishing means comprise a magnet having two pole pieces, having first portions extending respectively along said delay line sections and other portions extending respectively along the two branches of said U-shaped electrode, the distances between said pole piece portions and said delay line sections on the one hand and said U-shaped electrode on the other hand being different.

3. A delay line as claimed in claim 2, wherein the distance between said pole piece and said delay line sections is smaller than the distance between said pole pieces and said U-shaped electrode.

4. A delay line as claimed in claim 1, wherein said elongated electrode forms an integral body.

5. A delay line as claimed in claim 1, wherein said elongated electrode comprises a plurality of bodies spaced apart from each other.

References Cited

UNITED STATES PATENTS

| | | | |
|---|---|---|---|
| 2,794,936 | 6/1957 | Huber | 315—39.3 X |
| 3,084,275 | 4/1963 | Chapell | 315—39.3 X |
| 3,417,280 | 12/1968 | Kantorowicz | 315—39.3 X |

ELI LIEBERMAN, Primary Examiner

P. L. GENSLER, Assistant Examiner

U.S. Cl. X.R.

315—39.3; 333—31